US012698741B2

(12) United States Patent
Gourishankar et al.

(10) Patent No.: US 12,698,741 B2
(45) Date of Patent: Aug. 4, 2026

(54) THERMAL INSULATION ASSEMBLY

(71) Applicants:General Electric Company, Schenectady, NY (US); Unison Industries, LLC, Jacksonville, FL (US)

(72) Inventors: Karthick Gourishankar, Bangalore (IN); Mohandas Nayak, Bangalore (IN); Rejin Ratnakar, Bangalore (IN); Eric Daniel Holbrook, Vandalia, OH (US)

(73) Assignee: General Electric Company, Evendale, OH (US)

( * ) Notice: Subject to any disclaimer, the term of this patent is extended or adjusted under 35 U.S.C. 154(b) by 577 days.

(21) Appl. No.: 18/333,597

(22) Filed: Jun. 13, 2023

(65) Prior Publication Data

US 2024/0280054 A1     Aug. 22, 2024

(30) Foreign Application Priority Data

Feb. 22, 2023    (IN) .............................. 202311012072

(51) Int. Cl.

| | |
|---|---|
| *F02C 7/24* | (2006.01) |
| *B32B 1/08* | (2006.01) |
| *B32B 3/28* | (2006.01) |
| *B32B 9/00* | (2006.01) |
| *B32B 9/04* | (2006.01) |

(52) U.S. Cl.
CPC .................. *F02C 7/24* (2013.01); *B32B 1/08* (2013.01); *B32B 3/28* (2013.01); *B32B 9/005* (2013.01); *B32B 9/041* (2013.01); *B32B 2250/04* (2013.01); *B32B 2255/20* (2013.01); *B32B 2307/304* (2013.01); *B32B 2307/416*
(2013.01); *B32B 2307/418* (2013.01); *F05D 2240/15* (2013.01); *F05D 2260/231* (2013.01)

(58) Field of Classification Search
CPC ..... F02C 7/24; B32B 1/08; B32B 3/28; B32B 9/005; B32B 9/041; B32B 2250/04; B32B 2255/20; B32B 2307/304; B32B 2307/416; B32B 2307/418; F05D 2240/15; F05D 2260/231
USPC ........................................................ 138/149
See application file for complete search history.

(56) References Cited

U.S. PATENT DOCUMENTS

| | | | | |
|---|---|---|---|---|
| 3,715,265 A | * | 2/1973 | Allen ...................... | B32B 15/16 |
| | | | | 428/920 |
| 3,948,295 A | | 4/1976 | Lemont et al. | |
| 4,925,134 A | | 5/1990 | Keller et al. | |
| 5,316,837 A | | 5/1994 | Cohen | |

(Continued)

FOREIGN PATENT DOCUMENTS

| | | |
|---|---|---|
| CN | 205078993 U | 3/2016 |
| EP | 4170219 A1 | 4/2023 |
| JP | 5744604 | 7/2015 |

*Primary Examiner* — David R Deal
(74) *Attorney, Agent, or Firm* — McGarry Bair PC

(57) ABSTRACT

A thermal insulation assembly for a duct through which high temperature fluid, greater than 500 Fahrenheit, passes. The thermal insulation assembly can experience pressures less than 80 kilopascals and can be included in a turbine engine. The thermal insulation assembly includes a first foil layer confronting the duct, a second foil layer spaced from the first foil layer, an insulation layer between the first foil layer and the second foil layer, an opacifier layer provided on the insulation layer, and a reflective layer applied to the opacifier layer.

20 Claims, 5 Drawing Sheets

(56) References Cited

U.S. PATENT DOCUMENTS

| | | | |
|---|---|---|---|
| 5,441,550 A | | 8/1995 | Hassenboehler, Jr. et al. |
| 5,958,578 A | | 9/1999 | Blohowiak |
| 6,264,144 B1 | | 7/2001 | Thornton |
| 7,313,909 B2 | | 1/2008 | Skoog et al. |
| 8,758,502 B2 | | 6/2014 | Nienburg et al. |
| 8,766,108 B2 | | 7/2014 | Bunyan et al. |
| 9,585,249 B2 | | 2/2017 | Cox et al. |
| 10,160,184 B2 | | 12/2018 | Conolly et al. |
| 10,967,961 B2 | | 4/2021 | Leiva et al. |
| 10,995,884 B1 | | 5/2021 | Campbell et al. |
| 2002/0119339 A1* | | 8/2002 | Ragland ................... B32B 38/06<br>72/379.6 |
| 2003/0082369 A1* | | 5/2003 | Arndt ...................... B32B 27/10<br>156/244.11 |
| 2004/0022973 A1* | | 2/2004 | Bussey, Jr. .............. B32B 29/02<br>428/36.5 |
| 2009/0133347 A1* | | 5/2009 | Wadsworth ........... F16L 59/029<br>52/406.2 |
| 2010/0003877 A1 | | 1/2010 | Fan et al. |
| 2011/0023430 A1* | | 2/2011 | Kumar ................... F01N 3/2864<br>55/486 |
| 2011/0024433 A1* | | 2/2011 | Rolland ................... B32B 27/30<br>220/592.2 |
| 2012/0251796 A1* | | 10/2012 | Potter ................. C03B 37/0753<br>442/172 |
| 2014/0141199 A1* | | 5/2014 | Leonard .................... B32B 3/26<br>428/317.9 |
| 2014/0227552 A1 | | 8/2014 | Lau et al. |
| 2014/0287641 A1* | | 9/2014 | Steiner, III ................ B32B 5/26<br>428/317.1 |
| 2017/0356343 A1* | | 12/2017 | Roach ....................... F02C 7/24 |
| 2023/0117007 A1* | | 4/2023 | Gourishankar ......... B32B 15/20<br>428/626 |

* cited by examiner

THERMAL INSULATION ASSEMBLY

TECHNICAL FIELD

The disclosure relates to a thermal insulation assembly for a conduit, tube, or duct, or more specifically, a thermal insulation assembly for an aerospace component, conduit, tube, or duct.

BACKGROUND

A thermal insulation assembly or heat shield can circumscribe or otherwise be placed adjacent to one or more tubes, ducts, or features carrying a hot fluid or having operating temperatures with a large temperature difference relative to an adjacent environment. The purpose of the thermal insulation assembly is to maintain the temperature in the tube, duct, or other feature and provide an outer surface that has a relatively cooler temperature. The thermal resistivity of the thermal insulation assembly depends on the thermal conductivity of the materials used, the thickness of the materials used, or which particular materials are used to make the thermal insulation assembly.

BRIEF DESCRIPTION OF THE DRAWINGS

A full and enabling disclosure of the aspects of the present description, including the best mode thereof, directed to one of ordinary skill in the art, is set forth in the specification, which refers to the appended Figures, in which.

DETAILED DESCRIPTION

Figure 1:
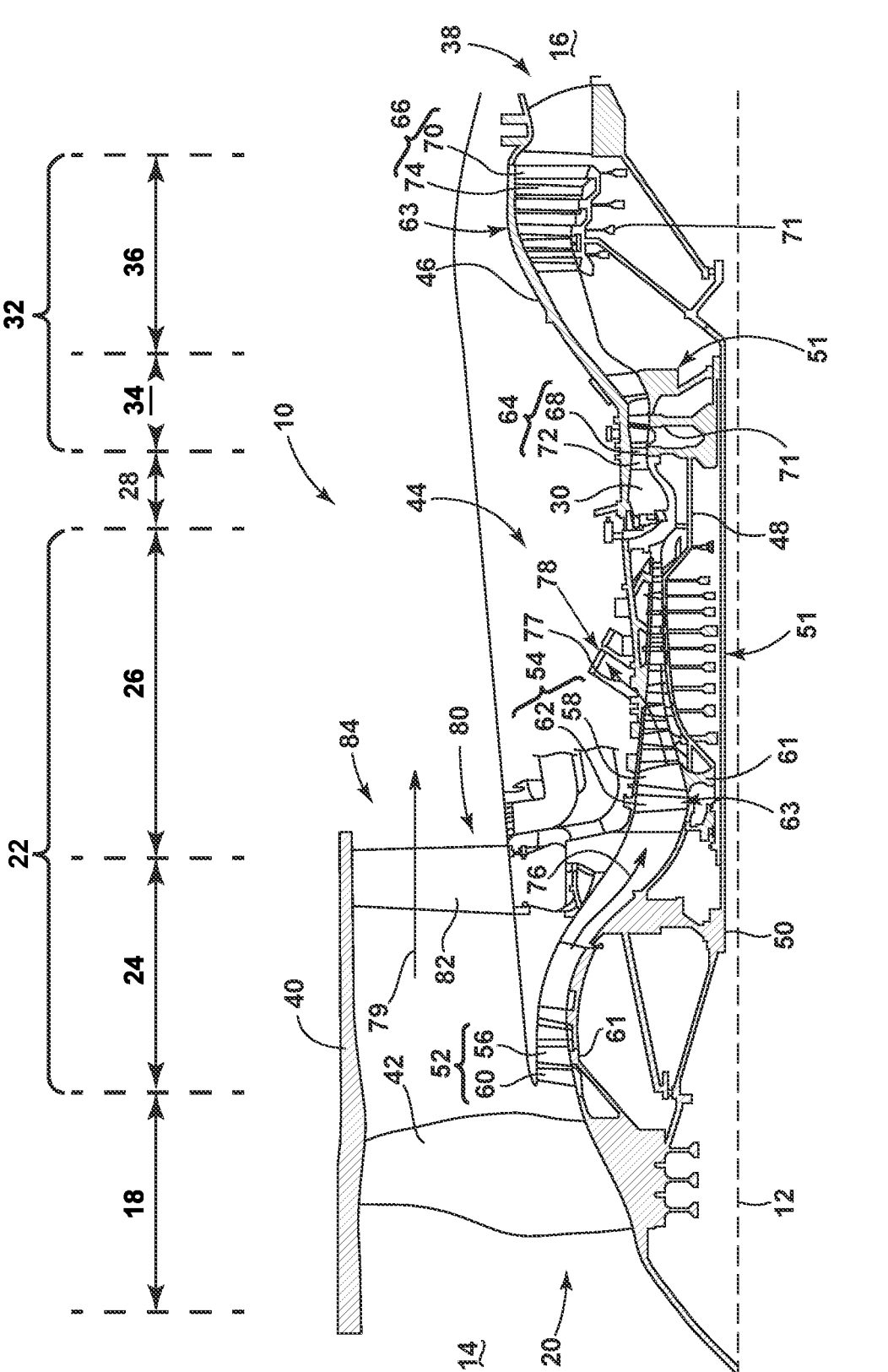
FIG. 1 is a schematic, sectional view of a turbine engine having a duct, in accordance with aspects of the disclosure.

A thermal insulation assembly, in the context of a turbine engine, is required to perform in a variety of environments, considering a variety of conditions for any given environment. Aircraft engines operate in an environment of varying ambient air pressures where ambient air pressures can be between 10-110 kilopascals (kPa) or 1.4-16 pounds per square inch (PSI). In less than standard atmospheric pressure or low-pressure aerospace environments (ambient air pressures of 80 kPa or 11.6 PSI or less), heat transfer is dominated by radiation and conduction, rather than convection. That is, as ambient pressures decrease, the rate at which heat transfer occurs by radiation and conduction increases relative to that of convection. The temperatures of the fluid or gas in some of the tubes and ducts of the turbine engine, while starting or once started, can equal 500 degrees Fahrenheit (260° Celsius or approximately 533 Kelvin) or more, while other local temperatures can be significantly cooler, such as for a temperature for a bleed air duct. At higher temperatures, radiation, and specifically infrared radiation (IR), becomes the primary mode of heat transfer as opposed to cooler temperatures in which conduction or convection can operate as the primary mode of heat transfer. Therefore, there is a need for improved thermal resistivity to IR radiation, particularly in aerospace environments, in order to reduce local touch temperatures or component temperatures, or in order to thermally insulate cooler temperatures from such infrared radiation. While a thicker, heavier thermal insulation assembly can possibly provide additional thermal resistivity, the thicker, heavier thermal insulation assembly would increase the mass and occupy precious volume in an aerospace environment, where mass and volume are at a premium in determining overall operational efficiency and fuel cost. These environmental requirements can make utilizing thicker or heavier materials impractical or functionally impossible for existing aerospace systems. Therefore, a more creative solution is needed to account for IR radiation without increasing or with a reduced need to increase mass and volume for the thermal insulation assembly.

Aspects of the present disclosure are directed to a thermal insulation assembly for an aerospace component, conduit, tube, or duct. The layering and coatings for the assembly included in the disclosed thermal insulation assembly can increase thermal resistivity while decreasing or maintaining overall thickness of the thermal insulation assembly. Additionally, or alternatively, the thermal insulation assembly, as disclosed, can maintain thermal resistivity while decreasing the overall thickness, weight, or mass of the thermal insulation assembly.

It will be understood that the disclosure can have general use in a variety of applications, that is, the thermal insulation assembly can be utilized in any suitable mobile and/or non-mobile industrial, commercial, and/or residential application.

As used herein, the term "upstream" refers to a direction that is opposite the fluid flow direction, and the term "downstream" refers to a direction that is in the same direction as the fluid flow. The term "forward" means in front of something and "aft" means behind something. For example, when used in terms of fluid flow, fore/forward can mean upstream and aft/rearward can mean downstream.

Additionally, as used herein, the term "radially" refers to a direction toward and away from a common center. For example, in the overall context of a turbine engine, radial refers to a direction along a ray extending between a center longitudinal axis of the turbine engine and an outer turbine engine circumference. Furthermore, as used herein, the term "set" or a "set" of elements can be any number of elements, including only one.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor as defined above, and the controller module or processor can perform processing on the value to determine a representative value or an electrical characteristic representative of said value.

All directional references (e.g., radial, top, above, below, upstream, downstream, forward, aft, etc.) are used only for identification purposes to aid the reader's understanding of the present disclosure, and should not be construed as limiting on an example, particularly as to the position, orientation, or use of aspects of the disclosure described herein. Connection references (e.g., coupled, mounted) are to be construed broadly and can include intermediate members between a collection of elements and relative movement between elements unless otherwise indicated. As such, connection references do not necessarily infer those two elements are directly connected and in fixed relation to one another. The exemplary drawings are for purposes of illustration only and the dimensions, positions, order, and relative sizes reflected in the drawings attached hereto can vary.

As used herein, "confront" or "confronting" refers to a relationship among two elements, where one element confronts another element by contact among the two elements, or that one element faces the other element, with or without contact.

As used herein, a "thermal resistance" is a heat property and a measurement of a temperature difference by which an object or material resists a heat flow. The thermal resistance of an object can be expressed as shown in Equation 1 below:

$$R_t = \frac{L}{kA} \quad (1)$$

where $R_t$ represents thermal resistance, L is the thickness of the material or the thickness of the plane of the material, k is the thermal conductivity of the material or materials and is the quantity of heat that passes in unit time through a unit area of plate whose thickness is unity when its opposite faces differ in temperature by one degree, and A is the area of the plane or the cross-sectional area perpendicular to the path of heat flow. Therefore, the thermal resistance of a thermal insulation assembly depends on the thermal conductivity, thickness, and area of the material or materials used to make the thermal insulation assembly.

As used herein, the term "emissivity" is the ratio of heat energy radiated per unit time per unit area by an object to the amount of heat energy radiated per unit time per unit area by a perfect black body of the same temperature.

As used herein, the term "tuned" or variations thereof refers to a deterministic adjustment, range, or variation for a frequency or wavelength of heat or electromagnetic radiation within the assembly. More specifically, aspects described herein can be 'tuned' to interact with particular electromagnetic radiation frequencies or wavelengths. Such tuning can be achieved by utilizing certain materials or manufacture methods, where tuning the materials described herein can include manufacturing the assembly or portions thereof to have properties 'tuned' to interact with certain frequencies or wavelengths of electromagnetic radiation, or portions of the infrared electromagnetic spectrum.

FIG. 1 is a schematic cross-sectional diagram of a turbine engine 10 for an aircraft. The turbine engine 10 defines a longitudinal axis 12 extending from a forward end 14 to an aft end 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed circumferentially about the longitudinal axis 12. The HP compressor 26, the combustor 30, and the HP turbine 34 form an engine core 44, which generates combustion gases. The engine core 44 is surrounded by a core casing 46, which can be coupled with the fan casing 40.

A HP shaft or HP spool 48 disposed coaxially about the longitudinal axis 12 of the turbine engine 10 drivingly connects the HP turbine 34 to the HP compressor 26. An LP shaft or LP spool 50, which is disposed coaxially about the longitudinal axis 12 of the turbine engine 10 within the larger diameter annular HP spool 48, drivingly connects the LP turbine 36 to the LP compressor 24 and fan 20. The HP and LP spools 48, 50 are rotatable about the longitudinal axis 12 and couple to a plurality of rotatable elements, which can collectively define an inner rotor/stator 51. While illustrated as a rotor, it is contemplated that the inner rotor/stator 51 can be a stator.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the longitudinal axis 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to a disk 61, which is mounted to the corresponding one of the HP and LP spools 48, 50, with each stage having its own disk 61. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the longitudinal axis 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The static turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine section 22, 32 are also referred to individually or collectively as an outer rotor/stator 63. As illustrated, the outer rotor/stator 63 can refer to the combination of non-rotating elements throughout the turbine engine 10. Alternatively, the outer rotor/stator 63 that circumscribes at least a portion of the inner rotor/stator 51, can be designed to rotate. The inner or outer rotor/stator 51, 63 can include at least one component that can be, by way of non-limiting example, a shroud, vane, nozzle, nozzle body, combustor, hanger, or blade, where the at least one component is a plurality of circumferentially arranged component segments having confronting pairs of circumferential ends.

In operation, the turbine engine 10 can move through a cycle of operation. The cycle of operation can include, but is not limited to, start-up, idle, take-off, cruse, decent or land, and shut-down. During start-up the turbine engine 10 is provided with mechanical energy to begin the rotation of the HP shaft or HP spool 48 or the LP shaft or LP spool 50. Once started, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling via at least one aerospace conduit, tube, or duct 78. The temperature of pressurized airflow 76 entering the combustor 30 is significantly increased. As such, cooling provided by the bleed air 77 is necessary for operating of such engine components in the heightened temperature environments.

A remaining portion of the airflow 79 bypasses the LP compressor 24 and the engine core 44 and exits the turbine engine 10 assembly through a stationary vane row, and more particularly an outlet guide vane assembly 80, including a plurality of airfoil guide vanes 82, at the fan exhaust side 84. More specifically, a circumferential row of radially extending airfoil guide vanes 82 are utilized adjacent the fan section 18 to exert some directional control of the airflow 79.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

The turbine engine 10 can move through the different portions of the cycle of operation by increasing, decreasing, or maintaining fuel provided to the combustor 30. Additionally, or alternative, the turbine engine 10 can then move through the different portions of the cycle of operation by increasing, decreasing, or maintaining the rotational speed of one or more components.

Figure 2:
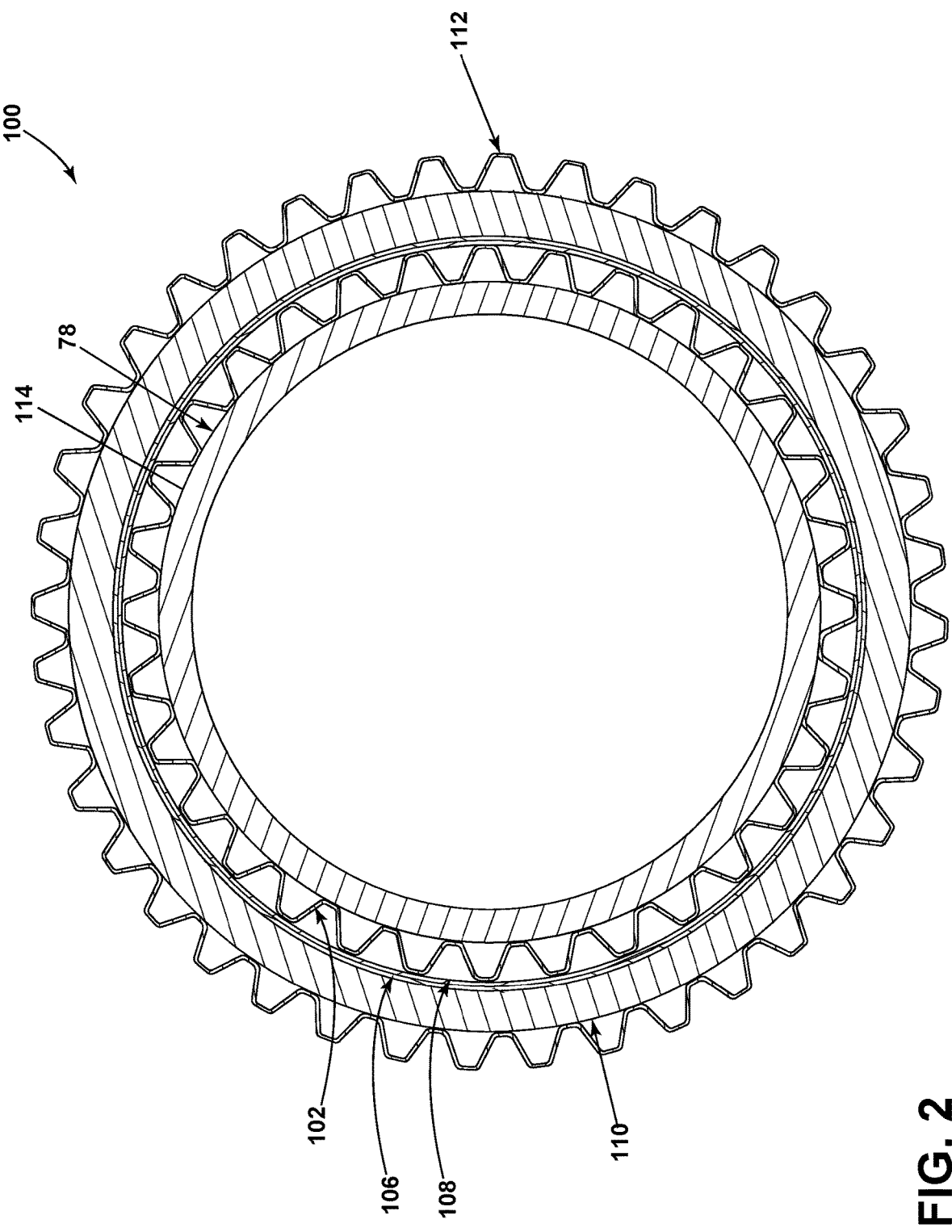
FIG. 2 is a schematic cross section of the duct of FIG. 1 illustrating a thermal insulation assembly covering or encasing the duct, in accordance with aspects of the disclosure.

FIG. 2 is a schematic illustration of an aerospace component, conduit, tube, or duct that includes a multi-layer, thermal wrap, heat shield, thermal insulation stack, or thermal insulation assembly, illustrated as a thermal insulation assembly 100. The thermal insulation assembly 100 includes a first foil layer 102, an opacifier layer 106, a reflective layer 108, an insulation layer 110, and a second foil layer 112. The duct 78 can include an exterior surface 114 that confronts the first foil layer 102. The thermal insulation assembly 100 is illustrated as circumscribing, covering, or encasing the duct 78. It is contemplated that the thermal insulation assembly 100 can be located adjacent to or conform to one or more portions of the duct 78. That is, the thermal insulation assembly 100 does not have to completely circumscribe or surround the duct 78. Additionally, or alternatively, the thermal insulation assembly 100 can circumscribe, be located adjacent, or located within the nacelle or fan casing 40 (FIG. 1). It is also contemplated that the thermal insulation assembly 100 can circumscribe or be adjacent to an exterior of the engine core 44 (FIG. 1). It is further contemplated that the thermal insulation assembly 100 can circumscribe or be located adjacent to one or more tubes or ducts within the engine core 44 (FIG. 1). While illustrated as circular in cross section, or cylindrical, additional geometries for the thermal insulation assembly 100 are contemplated.

Fluid passing through the duct 78 can be 500 degrees Fahrenheit (260° Celsius or approximately 533 Kelvin) or more. That is, fluid, such as the bleed air 77 of FIG. 1, flowing through the duct 78 can be at or above 500 degrees Fahrenheit (260° Celsius or approximately 533 Kelvin). The temperature of the fluid in the duct 78 can depend on the cycle of operation of the turbine engine 10 (FIG. 1), where different portions or steps of the cycle of operation can indicate or provide a range of possible temperatures of the fluid in the duct 78. For example, while the turbine engine 10 is not operating, the temperature of the fluid in the duct 78 can be as low as −50 (negative fifty) degrees Fahrenheit (approximately −46° Celsius; approximately 228 Kelvin). While in a cycle of operation, the duct 78 of the turbine engine 10 can experience fluids as hot as 2000 degrees Fahrenheit (approximately 1093° Celsius; approximately 1366 Kelvin), or greater. At temperatures at or above 500 degrees Fahrenheit (260° Celsius or approximately 533 Kelvin) heat transfer predominately occurs via infrared (IR) radiation.

Figure 3:
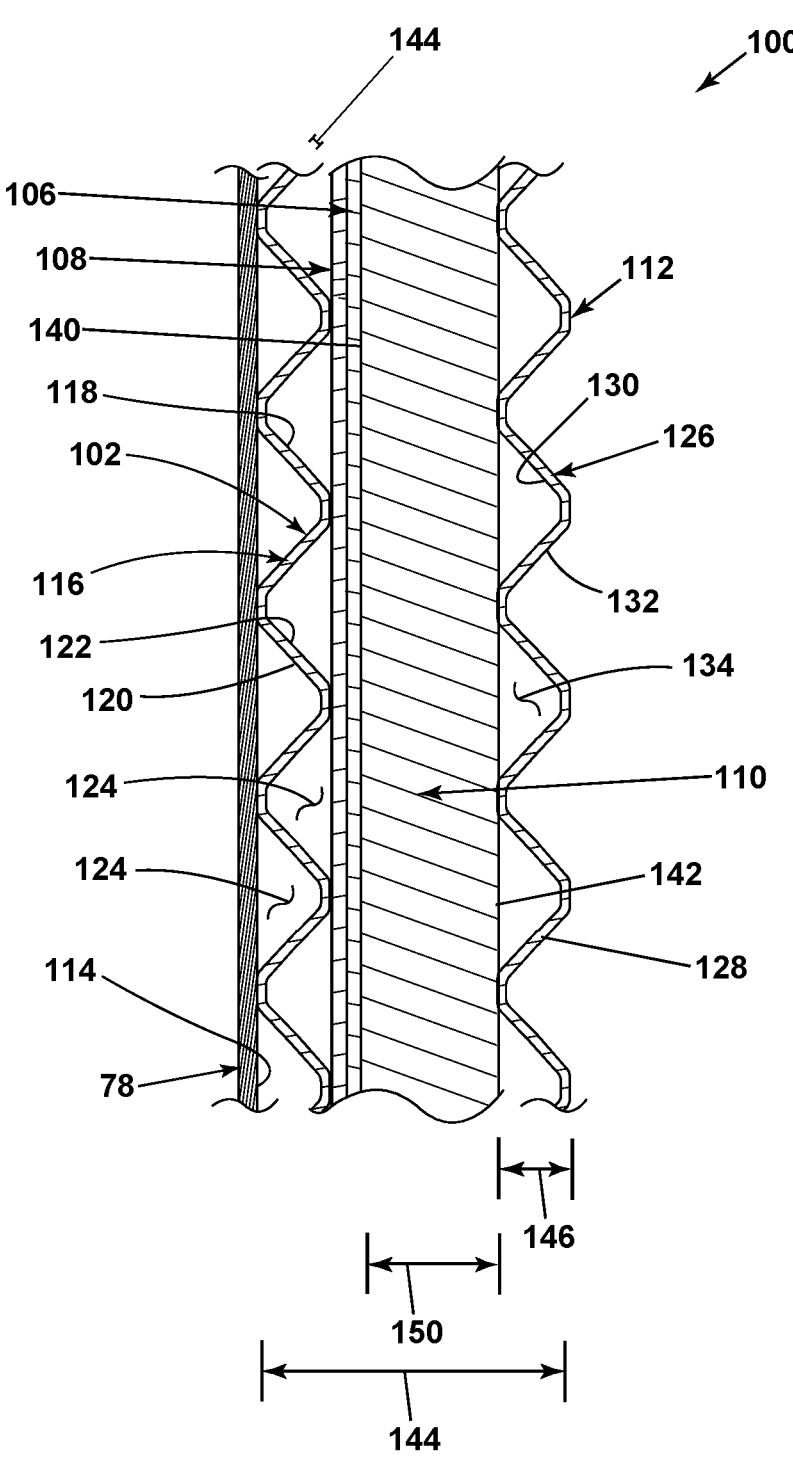
FIG. 3 is another schematic cross section of the thermal insulation assembly of FIG. 1, in accordance with aspects of the disclosure.

FIG. 3 shows another section of the thermal insulation assembly 100 and the duct 78. The first foil layer 102 can include a dimpled surface 116 with a plurality of dimples 118, and can include a first face 120 obverse to a second face 122. The first face 120 is in contact with or directly adjacent to the duct 78, while spacing or a gap is contemplated. The plurality of dimples 118 can define a plurality of gaps 124 between the first foil layer 102 and the exterior surface 114 of the duct 78, as well as between the first foil layer 102 and the reflective layer 108. That is, the plurality of gaps 124 can be defined as non-contacting portions of the first foil layer 102 and the duct 78 or the reflective layer 108. The plurality of gaps 124 can be filled with air or other fluids or gases in non-limiting examples. Alternatively, it is contemplated that the first foil layer 102 includes a non-dimpled surface. Such a non-dimpled surface can be in contact with the duct 78 or can include a gap. The first foil layer 102 can include, by way of non-limiting example, one or more of chromium, carbon, nitrogen, aluminum, silicon, sulfur, titanium, nickel, copper, selenium, niobium, molybdenum, iron, or stainless steel.

Similarly, the second foil layer 112 can include a dimpled surface 126 with a plurality of dimples 128, and includes a first face 130 and an obverse second face 132. The first face 130 can at least partially contact or confront the insulation layer 110, defining a plurality of gaps 134 between the second foil layer 112 and the insulation layer 110, while a fully spaced arrangement is contemplated. Alternatively, it is contemplated that the second foil layer 112 includes a non-dimpled surface. Such a non-dimpled surface can be in contact with the insulation layer 110 or can include a gap therebetween. While the second foil layer 112 is illustrated as in contact with the insulation layer 110, it is contemplated that one or more of an air gap, coating, or partial coating can be located between the second foil layer 112 and the insulation layer 110. The second foil layer 112 can include, by way of non-limiting example, one or more of chromium, carbon, nitrogen, aluminum, silicon, sulfur, titanium, nickel, copper, selenium, niobium, molybdenum, iron, or stainless steel.

While illustrated as generally sinusoidal (or gear-like in the cross section of FIG. 2), the dimpled structure of the first foil layer 102 and the second foil layer 112 can have any cross-sectional shape and can protrude or recess in more than one or two dimensions. It is further contemplated that the plurality of gaps 124, 134 can be formed within the first foil layer 102 or the second foil layer 112, or both. It is further contemplated that portions of the first foil layer 102 or the second foil layer 112 are dimpled, while other portions are non-dimpled. It is contemplated that the dimensions, number, or frequency of dimples can vary between the first foil layer 102 and the second foil layer 112. It is further contemplated that the materials and overall dimension of the first foil layer 102 can be different than the second foil layer 112. Each dimple of the plurality of dimples 118, 128 can have a dimple height 146 between 0.001 inches and 0.05 inches (approximately 25 micrometers-1270 micrometers), while any dimple height 146 is contemplated.

The insulation layer 110 includes materials that can slow heat transfer via conduction, slow heat transfer via convection, or even reflect a portion of incident infrared radiation, or any combination therein. The insulation layer 110 includes a first insulation surface 140 and obverse, a second insulation surface 142, relative to position of the duct 78. The first insulation surface 140 confronts the opacifier layer 106, and the second insulation surface 142 at least partially contacts or confronts the second foil layer 112, while spacing between the insulation layer 110 and the second foil layer 112 is contemplated. The insulation layer 110 can be a woven material that helps to trap the heat and reduce the infrared radiation provided at the second foil layer 112. Such a woven material can result in heat dissipation throughout the insulation layer 110. In one non-limiting example, the insulation layer 110 can be quilted, woven, or any contemplated combination of fibers or materials. By way of non-limiting example, the insulation layer 110 can include one or more of ceramic materials or fibers, silicate, fiberglass, oxygen, aluminum, silicon, titanium, zirconium, yttrium, iron, chromium, carbon, nitrogen, sulfur, nickel, copper, selenium, niobium, molybdenum, or stainless steel.

A thickness 144 can be measured from the first foil layer 102 to the second foil layer 112. Alternatively, it is contemplated that the thickness 144 can be measured from the first foil layer 102 at a trough, or closest point to the duct 78, to the second foil layer 112 at a peak, or farthest point from the duct 78. In one example, the thickness 144 can vary from 0.05 inches to 0.6 inches (approximately 1.27 millimeters to 15.2 millimeters). A maximum touch temperature or surface temperature at the second face 132 of the second foil layer 112 can be 550 degrees Fahrenheit (approximately 288° Celsius or 561 Kelvin) or less at any point of the cycle of operation of the turbine engine 10 (FIG. 1), for example. In other non-limiting examples, the maximum touch temperature can be system-dependent. More specifically, the maximum touch temperature for a component can be determined by the temperature of the material within the duct 78 and/or the touch temperature requirement for the thermal insulation assembly 100 insulating the duct 78 based upon the components or environment around the thermal insulation assembly 100. For example, where the duct 78 touches another component, a maximum touch temperature of 500-degrees Fahrenheit can be utilized. In another example, where fluid passing through the duct is cooler, such as less than 500-degrees Fahrenheit, or is a cold fluid being insulated from a hot environment, lesser touch temperatures would be required. In this way, it should be understood that the particular geometries, thicknesses, temperature, or other features for the thermal insulation assembly 100 can be dependent upon or specific to the particular assembly or related environment. For example, the particular engine environment or regional environment can determine required touch temperatures, which can determine the thicknesses or other requirements for the coatings in order to achieve the desired touch temperature or temperature change. Similarly, where cool fluids are utilized, the thermal insulation assembly 100 can be tailored to insulate the cool fluids, rather than preventing excessive external or touch temperatures.

A material thickness 144 of the first foil layer 102 can be measured from the first face 120 to the second face 122, and the second foil layer 112 can be measured from the first face 130 to the second face 132. While any value is contemplated, the material thickness can be between 0.001 inches and 0.008 inches (approximately 0.025 millimeters-0.025 millimeters). In one non-limiting example, the thermal conductivity of the first foil layer 102 and the second foil layer 112 can be between 5 British thermal units per foot hour degrees Fahrenheit (BTU/(ft*h*° F.)) and 140 BTU/(ft*h*° F.) (approximately 8 Watts per meter Kelvin (W/mK) and 242 W/mK). While any value is contemplated, the emissivity of the first foil layer 102 and the second foil layer 112 can be between 0.1 and 0.4. The emissivity of 0.1-0.4 for the first foil layer 102 can correspond to the first foil layer 102 in a pristine state.

An insulation thickness 150 of the insulation layer 110 can be measured from the first insulation surface 140 to the second insulation surface 142. The insulation thickness vary from 0.05 inch to 0.5 inches (approximately 1.2 millimeters to 12.7 millimeters), while any suitable thickness is contemplated.

The opacifier layer 106 can be applied to the first insulation surface 140 and the reflective layer 108 can be applied to the opacifier layer 106. Such application can include a spray coating, in one non-limiting example. Optionally, a primer layer (not shown) can be added to the insulation layer 110 prior to or during the application of the opacifier layer 106 to facilitate bonding of the opacifier layer 106 to the insulation layer 110.

The opacifier layer 106 can be opaque or otherwise blocking of IR radiation, and therefore have a high emissivity. For example, the opacifier layer 106 can be a refractive coating. For example, a silicon carbide coating can form the opacifier layer 106 for blocking infrared radiation at high operating temperatures, with a high emissivity. In one example, the opacifier layer 106 can have an emissivity at or between 0.4 and 1.0 at a temperature range of 2000 degrees Fahrenheit (approximately 1093° Celsius; approximately 1366 Kelvin) or less. The opacifier layer 106 can have thickness at or between 0.00005 inches to 0.01 inches (approximately 1.25 micrometers to 254 micrometers).

The reflective layer 108 reflects a predetermined range of infrared radiation. For example, the reflective layer 108 can be an alumina-silica based coating. The reflective layer 108 can be adapted, configured, or otherwise tuned to a particular range of infrared wavelength in the electromagnetic spectrum. Such tuning can be achieved with the materials used or manufacture methods, for example. In one non-limiting example, the reflective layer 108 can reflect a wavelength range of approximately 0.7 to 1000 microm-eters. The reflective layer 108 provides for high reflection at the duct 78, while being durable enough to withstand the high temperatures being near or contacting the duct 78. The reflective layer 108 can include one or more of silica, alumina, titania, silicon, aluminum, titanium, tantalum, zir-conium, yttrium, niobium, tungsten, molybdenum, iron, oxygen, germanium, zinc, sulfide, sulfur, selenide, calcium, fluorine, boron, gallium, arsenide, cadmium, telluride, cesium, bromide, iodide, chalcogenide glass, lithium, mag-nesium, fluoride, nickel, or copper, or combinations thereof.

The turbine engine 10 (FIG. 1), and therefore the thermal insulation assembly 100 or the duct 78, can experience atmospheric pressures anywhere between 10 kilopascal (kPa) and 110 kPa during a cycle of operation. It is further contemplated that at least a portion of the cycle of operation takes place in atmospheric pressure that at or below 80 kPa, such that the turbine engine 10, the duct 78, and the thermal insulation assembly 100 experience atmospheric pressure at or below 80 kPa. Thermal radiation at such pressures occurs mostly through infrared radiation.

Utilizing the opacifier layer 106 with or beneath the reflective layer 108 provides for blocking additional infrared radiation that may otherwise escape through the reflective layer 108. More specifically, the materials utilized or the operating environment can provide for conditions where at least a portion of the infrared radiation passes through the reflective layer 108. The opacifier layer 106 can reflect at least a portion of this infrared radiation that passes through the reflective layer 108 back toward or through the reflective layer 108.

Furthermore, the opacifier and reflective layers 106, 108 can be tuned to the anticipated range of infrared radiation that is emitted from the duct 78. The reflective layer 108 can be made of materials, manufactured, or otherwise adapted to reflect a large amount of radiation, including a large portion of infrared radiation. Where a portion of the infrared radia-tion may escape through the reflective layer 108, tuning the reflective layer 108 can limit the electromagnetic wave-length or range thereof that reaches the opacifier layer 106. Such a limitation can be intentionally manufactured for the reflective layer 108. The opacifier layer 106 can be tuned to the same wavelength or range as the reflective layer 108, or another particular electromagnetic wavelength, or range thereof. The tuning for the opacifier layer 106 can be adapted to the wavelength for infrared radiation that passes through the reflective layer 108, in order to capture radiation that escapes through the reflective layer 108, or to different infrared wavelengths than that of the reflective layer 108, in order to cover a wider range of infrared radiation than is provided by the reflective layer 108 alone. Such tuning can be the result of the materials used or the manufacture process for the opacifier layer 106. In this way, the total radiation, heat, energy, or otherwise that is blocked and/or reflected by the thermal insulation assembly 100 using the opacifier and reflective layers 106, 108 is increased compared to a system without utilizing both the opacifier and reflective layers 106, 108 having similar sizes and materials.

With a greater amount of radiation being blocked and reflected by the opacifier and reflective layers 106, 108, the total amount of radiation that is required to be absorbed or reflected by the insulation layer 110 is therefore reduced or decreased. Such a reduction can provide for an overall reduction in size for the thermal insulation assembly 100, as opposed to a system which does not include either or both of the opacifier and reflective layers 106, 108. This reduction can be seen in the thickness 144, which can be thinner than that of traditional insulation assemblies without the opacifier and reflective layers 106, 108. The reduction in thickness increases available space within the turbine engine 10 where mass and volume are at a premium in determining overall operational efficiency and fuel cost. This reduction in thick-ness also provides for a related reduction in weight for the turbine engine 10 (FIG. 1), which can improve or increase operational efficiency. Therefore, the thermal insulation assembly 100 for the turbine engine 10 can provide for improved thermal insulation around components or ducting assemblies or systems, improved and increased infrared radiation insulation, decreased local component touch or surface temperatures, decreased assembly and component weight, decreased assembly and component size, and increased overall assembly and engine operational effi-ciency. Furthermore, decreased touch or surface tempera-tures requires reduced insulation for adjacent components, thereby increasing overall available space within an engine system where space and weight come at a premium.

Figure 4:
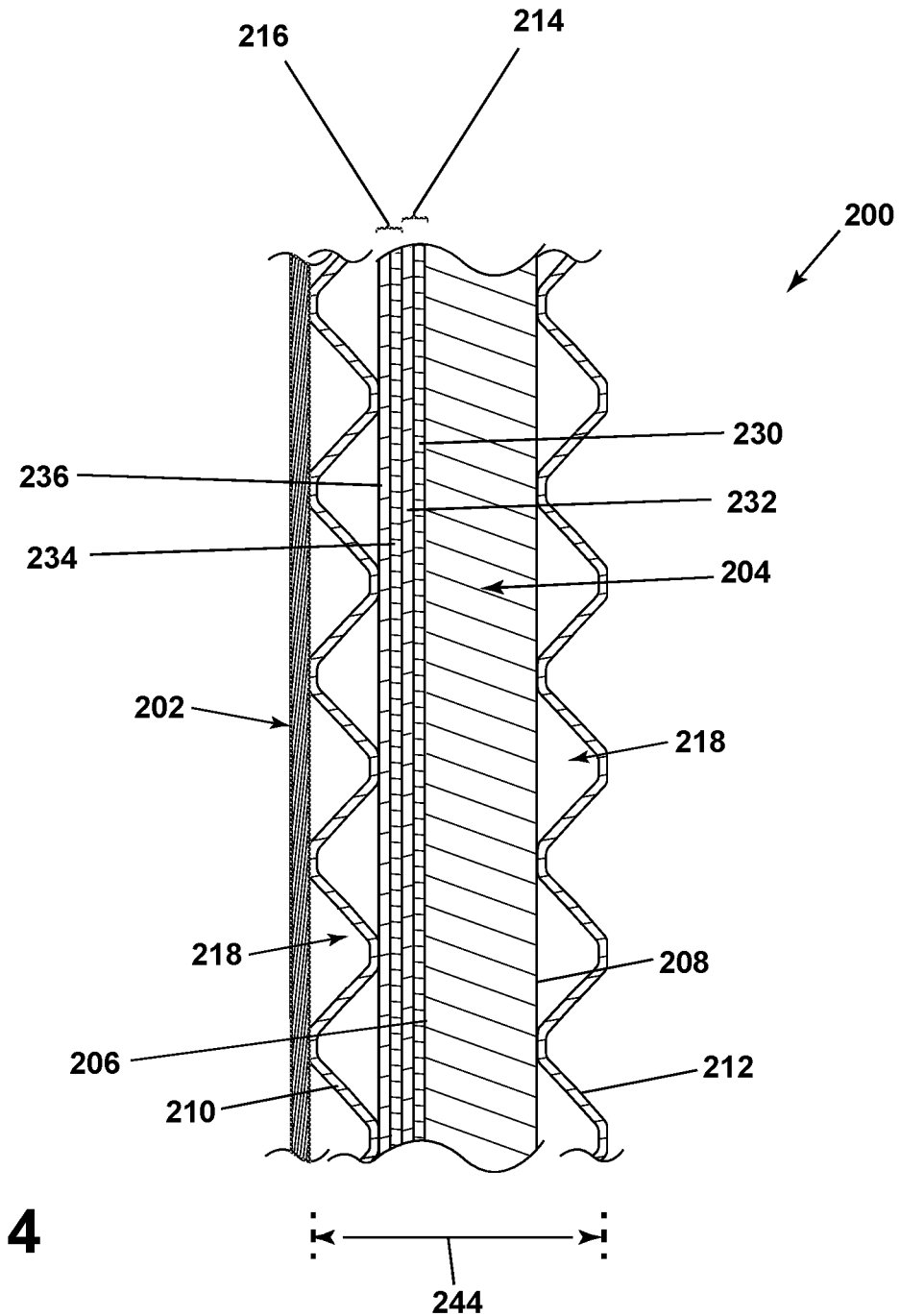
FIG. 4 is a schematic view of a bi-layer thermal insulation assembly and duct, in accordance with aspects of the disclosure.

FIG. 4 shows a section of a thermal insulation assembly 200 and a duct 202, which can be similar to the duct 78 of FIG. 1, for example. The thermal insulation assembly 200 can include an insulation layer 204 having a first side 206 and a second side 208, and provided between a first foil layer 210 and a second foil layer 212. The first foil layer 210 and the second foil layer 212 can include a plurality of dimples 218, while non-dimpled or partially-dimpled implementa-tions are contemplated in non-limiting examples. While illustrated as at least partially in contact with the duct 202, it is contemplated that one or more of an air gap, coating, or partial coating can be located between the thermal insulation assembly 200 and the duct 202. The first foil layer 210 can include, by way of non-limiting example, one or more of chromium, carbon, nitrogen, aluminum, silicon, sulfur, tita-nium, nickel, copper, selenium, niobium, molybdenum, iron, or stainless steel.

A first bi-layer coating 214 is provided on the first side 206 of the insulation layer 204 between the first foil layer 210 and the insulation layer 204. A second bi-layer coating 216 is provided on the first bi-layer coating 214. The first bi-layer coating 214 includes a first opacifier layer 230 confronting the insulation layer 204 and a first reflective layer 232 provided on the first opacifier layer 230, opposite of the insulation layer 204. Similarly, the second bi-layer coating 216 can include a second opacifier layer 234 and a second reflective layer 236, with the second opacifier layer 234 provided on the first bi-layer coating 214, and the second reflective layer 236 provided on the second opacifier layer 234.

It is contemplated that the first bi-layer coating 214 and the second bi-layer coating 216 can be identical, similar, or different. More specifically, the first and second bi-layer coatings 214, 216 can be identical, being made from iden-tical material and having identical sizing, while being lay-ered on top of one another or adjacent one another. Where the first and second bi-layer coatings 214, 216 can be similar, they can include similar materials or similar sizing, while having some variation among the first and second bi-layer coatings 214, 216. For example, the first bi-layer coating 214 may have a relatively greater thickness, or the second bi-layer coating 216 may have a relatively lesser thickness, while utilizing similar materials. It is further contemplated that the first and second opacifier and reflective layers 230, 232, 234, 236 of the first and second bi-layer coatings 214, 216 can have varied thicknesses. In another non-limiting example, the first bi-layer coating 214 may be tuned to a different electromagnetic frequency than the second bi-layer coating 216. Where the first and second bi-layer coatings 214, 216 are different, they can utilize different materials and different sizing. Furthermore, the different bi-layer coatings 214, 216 can be separately tuned to different types or frequencies of radiation. For example, the second bi-layer coating 216 can be tuned to infrared wavelengths that are shorter, or having a higher frequency, while the first bi-layer coating 214 can be tuned to infrared wavelengths that are relatively longer or have a lower frequency than that of the second bi-layer coating 216.

Furthermore, it is contemplated that more than just the first and second bi-layer coatings 214, 216 are utilized, such as where the thermal insulation assembly 200 includes a plurality of bi-layers. Each individual bi-layer coating, or layer thereof, can be tailored to a particular type of wavelength or frequency, thereby insulating a range of infrared radiation, or tailored to duct or environment specific frequencies. For example, a plurality of bi-layers could be tuned to different infrared frequencies or wavelengths, thereby blocking and reflecting a wider range of frequencies than that capable of a lesser number of bi-layers. It should be further appreciated that while multiple bi-layers can be utilized, the overall size and weight for the insulation assembly can be reduced by requiring a thinner or lighter insulation layer 204.

An assembly thickness 244 can be measured from the first foil layer 210 to the second foil layer 212. Utilizing both the first and second bi-layer coatings 214, 216, the assembly thickness 244 can be decreased, relative to an assembly without the first and second bi-layer coatings 214, 216. More specifically, the first and second bi-layer coatings 214, 216 can provide for reducing thermal radiation reaching the insulation layer 204, compared to an assembly without the bi-layer coatings, thereby reducing the amount of thermal radiation required to be reflected or absorbed by the insulation layer 204. Therefore, the insulation layer 204 can be reduced in size and mass, permitting an overall assembly that is both smaller and lighter, despite the added first and second bi-layer coatings 214, 216.

In one non-limiting example, the inclusion of the first and second bi-layer coatings 214, 216 reduces the required thickness of the insulation layer 204 by 5%-70% while maintaining or increasing overall thermal resistance for the thermal insulation assembly 200. It is further contemplated that the inclusion of at least one bi-layer coating can reduce the required thickness of the insulation layer 204 by 5%-70% while increasing the thermal resistance between 1%-60%, in another non-limiting example.

Figure 5:
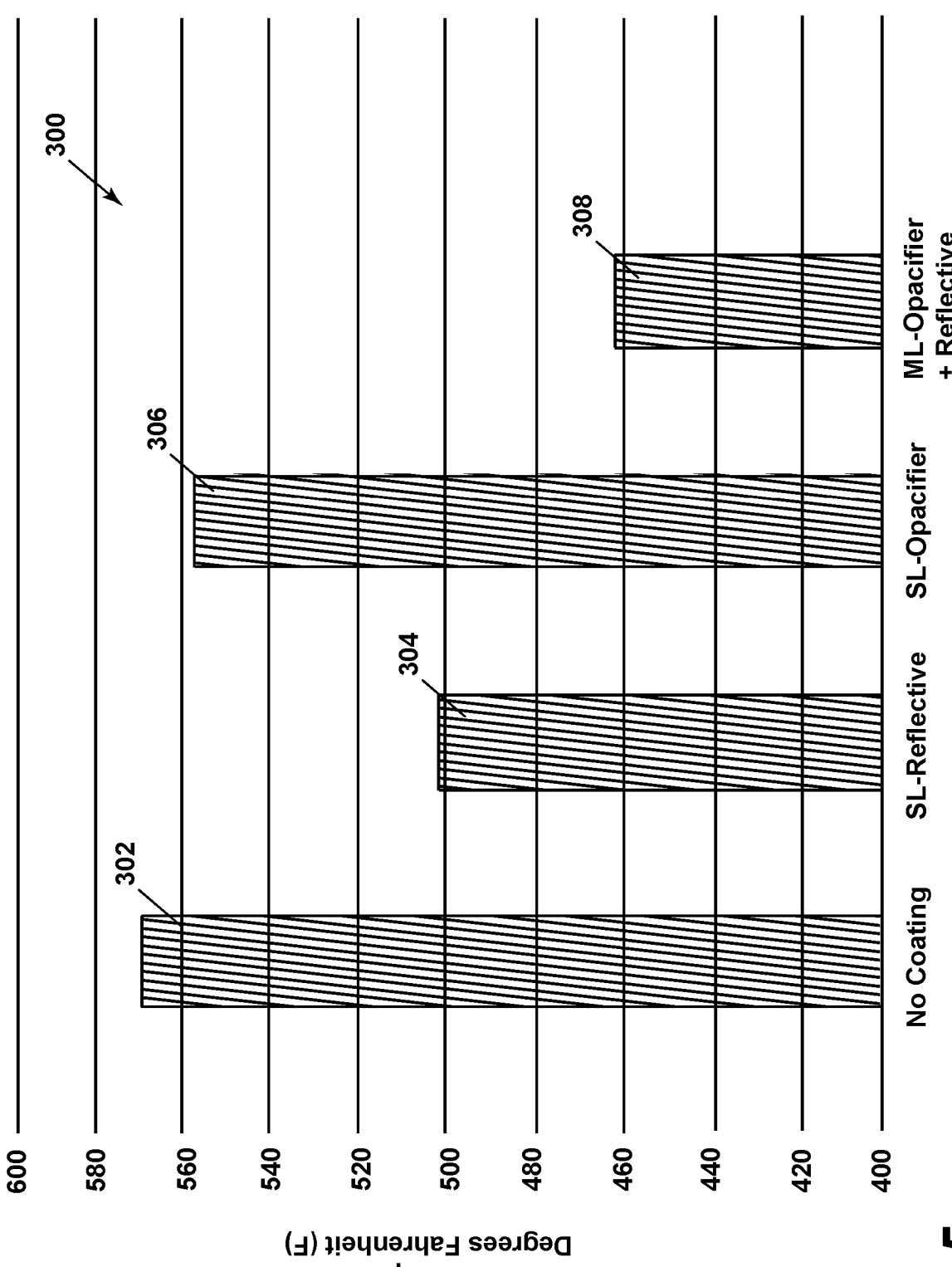
FIG. 5 shows a plot illustrating temperature change for a set of coatings used for insulation, in accordance with aspects of the disclosure.

Referring to FIG. 5, a chart 300 indicates the surface temperature, or touch temperature, in degrees of Fahrenheit for thermal insulation assemblies having a total thickness of 26 mils (where one mil represents one-thousandth of an inch), where each layer can be 10 mils and an insulation layer can have a thickness of 6 mils. Specifically, the chart 300 indicates a temperature change for a system having no coating 302, a system utilizing a single layer (SL) with a reflective coating 304, a system utilizing a single layer (SL) with an opacifier coating 306, and a multi-layer (ML) coating 308 using an opacifier coating such as the opacifier layers 106, 230, 234 and a reflective coating such as the reflective layers 108, 232, 236, as included in the thermal insulation assemblies 100, 200 of FIGS. 2-4. As can be appreciated in the chart 300, utilizing the multi-layer coating 308 provides for a greater reduction in surface temperature.

Such a reduction in surface temperature can also reduce required thickness or mass of an insulation layer, which provides for an overall reduction in size and weight for the assembly, while maintaining or increasing thermal resistance, particularly within the infrared range.

Aspects of the present disclosure provide for a variety of benefits including incorporating thin low-mass infrared radiation coatings in high-temperature radiation dominated aerospace environments. The incorporation of the infrared coating in the heat shield or thermal insulation assembly lowers the overall mass and thickness of the thermal insulation assembly.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the inventive aspects of the present subject matter, including the best mode, and also to enable any person skilled in the art to practice the inventive aspects of the present subject matter, including making and using any devices or assemblies and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A thermal insulation assembly for a duct provided within a turbine engine, the thermal insulation assembly comprising: a first foil layer; a second foil layer spaced from the first foil layer; an insulation layer located between the first foil layer and the second foil layer, having a first insulation surface facing the first foil layer and a second insulation surface facing the second foil layer; a first opacifier layer confronting the first insulation surface; and a first reflective layer located between the first opacifier layer and the first foil layer.

The thermal insulation assembly of any preceding clause wherein the first opacifier layer is also a refractive layer.

The thermal insulation assembly of any preceding clause wherein the first reflective layer is tuned to reflect a range of infrared wavelength dependent on a temperature of the duct.

The thermal insulation assembly of any preceding clause wherein the first opacifier layer and the first reflective layer permit a decreased thickness for the insulation layer, compared to a system without the first opacifier layer and the first reflective layer.

The thermal insulation assembly of any preceding clause further comprising a second opacifier layer provided on the first reflective layer.

The thermal insulation assembly of any preceding clause further comprising a second reflective layer provided on the second opacifier layer.

The thermal insulation assembly of any preceding clause wherein the first foil layer is dimpled.

The thermal insulation assembly of any preceding clause wherein the second foil layer is dimpled.

The thermal insulation assembly of any preceding clause wherein the first foil layer contacts the first reflective layer.

The thermal insulation assembly of any preceding clause wherein the first opacifier layer is silicon carbide.

The thermal insulation assembly of any preceding clause wherein the first reflective layer is alumina-silica.

The thermal insulation assembly of any preceding clause wherein the first reflective layer is tuned to operate within a temperature range between 500-1200 degrees Celsius.

The thermal insulation assembly of any preceding clause wherein the first reflective layer is tuned to a first frequency and the first opacifier layer is tuned to a second frequency.

The thermal insulation assembly of any preceding clause wherein the first frequency is the same as the second frequency.

The thermal insulation assembly of any preceding clause wherein the first frequency is different from the second frequency.

The thermal insulation assembly of any preceding clause wherein the second reflective layer is tuned to a third frequency and the second opacifier layer is tuned to a fourth frequency.

The thermal insulation assembly of any preceding clause wherein the third frequency is the same as the fourth frequency.

The thermal insulation assembly of any preceding clause wherein the third frequency is different from the fourth frequency.

The thermal insulation assembly of any preceding clause wherein the first and second frequencies are the same as the third and fourth frequencies.

The thermal insulation assembly of any preceding clause wherein the first and second frequencies are different from the third and fourth frequencies.

A thermal insulation assembly for a duct, the thermal insulation assembly comprising: an insulation layer having a first insulation surface and a second insulation surface; a first opacifier layer confronting the first insulation surface; and a first reflective layer confronting the first opacifier layer.

The thermal insulation assembly of any preceding clause wherein the first reflective layer is tuned to reflect a range of infrared wavelength dependent on a temperature of the duct.

The thermal insulation assembly of any preceding clause wherein the first opacifier layer and the first reflective layer permit a decreased thickness for the insulation layer, compared to a system without the first opacifier layer and the first reflective layer, which requires a greater thickness for an insulation layer to achieve equivalent heat resistance.

The thermal insulation assembly of any preceding clause further comprising a second opacifier layer provided on the first reflective layer.

The thermal insulation assembly of any preceding clause further comprising a second reflective layer provided on the second opacifier layer.

A thermal insulation assembly for a duct, the thermal insulation assembly comprising: an insulation layer having a first insulation surface and a second insulation surface; and a first bi-layer coating including an opacifier layer provided on the first insulation surface and a reflective layer provided on the opacifier layer.

The thermal insulation assembly of any preceding clause further comprising a second bi-layer coating provided on the first bi-layer coating.

The thermal insulation assembly of any preceding clause wherein the first bi-layer coating and the second bi-layer coating are part of a set of multiple bi-layer coatings.

The thermal insulation assembly of any preceding clause wherein first bi-layer coating is tuned to a different wavelength than that of the second bi-layer coating.

The thermal insulation assembly of any preceding clause wherein the first bi-layer coating is tuned to the same wavelength as the second bi-layer coating.

The thermal insulation assembly of any preceding clause wherein the first reflective layer is tuned to reflect a first range of infrared wavelength and the first opacifier layer is tuned to reflect a second range of infrared wavelength, with the first range being different than the second range.

The thermal insulation assembly of any preceding clause the first reflective layer is tuned to reflect a first range of infrared wavelength and the first opacifier layer is tuned to reflect a second range of infrared wavelength, with the first range being different than the second range.

The thermal insulation assembly of any preceding clause wherein the first opacifier layer and the first reflective layer define a first bi-layer coating, and further comprising a second opacifier layer confronting the first reflective layer and a second reflective layer confronting the second opacifier layer, wherein the second opacifier layer and the second reflective layer form a second bi-layer coating.

The thermal insulation assembly of any preceding clause wherein the first bi-layer coating is tuned to a different wavelength than the second bi-layer coating.

What is claimed is:

1. A thermal insulation assembly for a duct provided within a turbine engine, the thermal insulation assembly comprising:
   a first foil layer;
   a second foil layer spaced from the first foil layer;
   an insulation layer located between the first foil layer and the second foil layer, the insulation layer having a first insulation surface facing the first foil layer and a second insulation surface facing the second foil layer;
   a first opacifier layer confronting the first insulation surface; and
   a first reflective layer located between the first opacifier layer and the first foil layer.

2. The thermal insulation assembly of claim 1, wherein the first opacifier layer is also a refractive layer.

3. The thermal insulation assembly of claim 1, wherein the first reflective layer is tuned to reflect a range of infrared wavelength dependent on a temperature of the duct.

4. The thermal insulation assembly of claim 1, wherein the first reflective layer is tuned to reflect a first range of infrared wavelength and the first opacifier layer is tuned to reflect a second range of infrared wavelength, with the first range being different than the second range.

5. The thermal insulation assembly of claim 1, further comprising a second opacifier layer provided on the first reflective layer.

6. The thermal insulation assembly of claim 5, further comprising a second reflective layer provided on the second opacifier layer.

7. The thermal insulation assembly of claim 1, wherein the first foil layer is dimpled.

8. The thermal insulation assembly of claim 7, wherein the second foil layer is dimpled.

9. The thermal insulation assembly of claim 7, wherein the first foil layer contacts the first reflective layer.

10. The thermal insulation assembly of claim 1, wherein the first opacifier layer is silicon carbide.

11. The thermal insulation assembly of claim 10, wherein the first reflective layer is alumina-silica.

12. The thermal insulation assembly of claim 1, wherein the first reflective layer is tuned to operate within a temperature range between 500-1200 degrees Celsius.

13. A thermal insulation assembly for a duct, the thermal insulation assembly comprising:

an insulation layer having a first insulation surface and a second insulation surface;

a first opacifier layer confronting the first insulation surface; and a first reflective layer confronting the first opacifier layer.

14. The thermal insulation assembly of claim 13, wherein the first reflective layer is tuned to reflect a range of infrared wavelength dependent on a temperature of the duct.

15. The thermal insulation assembly of claim 13, the first reflective layer is tuned to reflect a first range of infrared wavelength and the first opacifier layer is tuned to reflect a second range of infrared wavelength, with the first range being different than the second range.

16. The thermal insulation assembly of claim 13, further comprising a second opacifier layer provided on the first reflective layer.

17. The thermal insulation assembly of claim 16, further comprising a second reflective layer provided on the second opacifier layer.

18. A thermal insulation assembly for a duct, the thermal insulation assembly comprising:

an insulation layer having a first insulation surface and a second insulation surface; and a first bi-layer coating including an opacifier layer provided on the first insulation surface and a reflective layer provided on the opacifier layer.

19. The thermal insulation assembly of claim 18, further comprising a second bi-layer coating provided on the first bi-layer coating.

20. The thermal insulation assembly of claim 19, wherein the first bi-layer coating and the second bi-layer coating are part of a set of multiple bi-layer coatings.

* * * * *